United States Patent Office 3,084,131
Patented Apr. 2, 1963

3,084,131
AQUEOUS COATING COMPOSITIONS CONTAINING A WATER SOLUBLE ACRYLAMIDE POLYMER HAVING COLLOIDAL SILICA SOL DISPERSED THEREIN AND METHOD OF COATING THEREWITH
Gilbert J. McEwan, Webster Groves, and Richard P. Beimler, Ballwin, Mo., assignors to Monsanto Chemical Company, St. Louis, Mo., a corporation of Delaware
No Drawing. Filed June 6, 1958, Ser. No. 740,196
12 Claims. (Cl. 260—29.6)

This invention relates to compositions useful for coating purposes, more particularly to compositions of this type comprising an aqueous medium containing dissolved therein a water-soluble polymerization product of an acrylamide and having dispersed therein an alkali-stabilized colloidal silica, which compositions provide a clear continuous transparent soil-resistant film or coating. Also, this invention relates to processes for producing the said soil-resistant film or coating comprising the dried residue of the coating composition of this invention, to the dried residue so obtained and to fibrous cellulosic sheets having the dried residue adhered thereto.

In the coating of fibrous cellulosic sheets a wide variety of film-forming substances or compositions have been employed for the purpose of improving the appearance thereof and to protect the printing beneath from rubbing and smearing. Of the various materials employed varnish has found widespread acceptancy, however, it like other film-forming materials or compositions employed heretofore, while improving the appearance of the cellulosic sheet and protecting the printing thereon, has its drawbacks particularly that of increased dirt pick-up or soiling upon contact with dirt over the uncoated cellulosic sheet.

In accordance with this invention there is provided a coating composition comprising an aqueous medium containing a water-soluble amount of a water-soluble polymerization product of an acrylamide dissolved therein and an alkali-stabilized colloidal silica dispersed therein, the quantity of colloidal silica as $SiO_2$ being in excess of about 10 parts by weight per 100 parts by weight of the polymerization product of an acrylamide, which composition on drying provides a clear continuous transparent film or coating which is highly resistant to soiling upon contact with dirt.

By ""polymerization product of an acrylamide"" is meant a water-soluble polymerization product containing in the polymer molecules an average of at least 80 percent by weight of a member of the group consisting of (1) acrylamide and (2) alpha-methyl acrylamide and up to 20 percent by weight of at least one other monoethylenically unsaturated organic compound copolymerizable therewith, which polymerization product exhibits water solubility in excess of about 100 grams per liter of water at 25° C. Among the monoethylenically unsaturated organic compounds which upon copolymerizing with the said acrylamide or said alpha-methyl acrylamide provide a water-soluble polymerization product of this invention are acrylic acid and methacrylic acid and the respective lower alkyl esters thereof (i.e., methyl, ethyl and propyl esters), acrolein, methacrolein, the vinyl ethers such as butyl vinyl ether, the vinyl ketones such as methyl and ethyl vinyl ketone, the various vinyl substituted aromatics such as styrene, alpha-methyl styrene, vinyl pyridine, the various vinyl esters such as vinyl acetate, and the like.

The alkali-stabilized colloidal silicas of this invention, with which the water-soluble polymerization product of an acrylamide of this invention is admixed to provide the film-forming compositions of this invention, are in the form of aquasols which contain from 5% to 45% by weight, but preferably 15 to 40% by weight of colloidal silica as $SiO_2$ having an average ultimate particle size of less than about 250 millimicrons and generally in the range of about 5 to 200 millimicrons. These aquasols are further characterized by having a pH above 8.0 and preferably in the pH range of about 8.5 to 10.5. In general the $SiO_2:M_2O$ weight ratio will be in excess of 10:1 but preferably in the range of 30:1 to 200:1, wherein M is a monovalent alkali cation such as $Na^+$, $K^+$ or $NH_4^+$. Alkali-stabilized silica aquasols having these characteristics can be prepared by the procedures described in U.S. Patents 2,375,738, 2,244,325, 2,572,578, 2,574,902, 2,577,485 and 2,515,949. These aquasols are further characterized in that they contain less than 2% by weight of an inorganic salt (e.g. sodium sulfate) and are stable to gelation for a period of at least two months at room temperature.

In the film-forming or coating compositions of this invention the quantity of colloidal silica as $SiO_2$ will be in the range of about 5 to about 45% by weight and preferably in the range of about 15 to about 40% by weight. Additionally the amount of colloidal silica as $SiO_2$ will be in excess of 10 parts by weight per 100 parts by weight of the water-soluble polymerization product of an acrylamide of this invention, and preferably in the range of about 800 to 1500 parts by weight per 100 parts by weight of the water-soluble polymerization product of an acrylamide of this invention. In general the upper limit will be about 2500 parts by weight of colloidal silica as $SiO_2$ per 100 parts by weight of the water-soluble polymerization product.

The water-soluble polymerization product of an acrylamide of this invention can be admixed with the alkali-stabilized colloidal silica in various ways. For example the polymerization product can be added directly to an alkali-stabilized colloidal silica aquasol and dissolved therein. It can also be added to an alkali-stabilized colloidal silica aquasol in the form of an aqueous solution thereof, however, in such instances it is preferred that the aqueous solution be as concentrated as possible to avoid excessive dilution of the aquasol.

The film-forming composition of this invention can be employed for coating a wide variety of fibrous cellulosic sheet materials such as wood, plywood, paper and the like, by spraying, brushing, or rolling, and thereafter heat drying, as for example, by baking the applied composition at 50° C. to about 150° C. Of the fibrous cellulosic sheet materials paper is preferred and by the term ""paper"" as used herein and in the appended claims is meant matted or felted sheets of vegetable fiber formed on a fine screen from an aqueous suspension and includes cellulosic paper in its usual or ordinary sense, for example writing paper, wrapping paper, book paper, building paper, as well as paper of any thickness which includes paperboard, pasteboard, cardboard, fiberboard, corrugated board, boxboard, container board, and the like, whether sized or unsized.

As illustrative of this invention but not limitative thereof is the following:

Example I 30 parts by weight of a water-soluble polymerization product having an average molecular weight of 55,000 and containing 100% by weight acrylamide $(CH_2=CH—CO.NH_2)$ is added with agitation at room temperature to 1000 parts by weight of an alkali-stabilized colloidal silica aquasol having an $SiO_2$ content of 30% by weight, a pH of about 9.5, an $SiO_2:Na_2O$ weight ratio of about 150:1, an average particle size of about 150 millimicrons and a sodium chloride content of about 0.11% by weight."

A sheet of double faced corrugated board with B flute corrugations and patent white outer liner is coated on the outside employing a laboratory coating machine to provide a dried film of a thickness of 1 mil of the aforedescribed composition. The sheet is then removed and heated at 110° C. for about ten minutes. The resulting sheet is characterized by excellent antisoiling properties, high gloss, good scuff-resistance, and smooth clear continuous transparent finish. The coating did not deter from the tear strength of the corrugated board.

*Example II*

30 parts by weight of a water-soluble polymerization product of acrylamide and acrylic acid containing in the polymer molecules an average of 85 percent by weight of acrylamide, i.e. $CH_2=CH-CO.NH_2$, and an average of 15 percent by weight of acrylic acid is added with stirring to 1000 parts by weight of an alkali-stabilized colloidal silica aquasol having an $SiO_2$ content of about 24% by weight, a pH of about 9.5, and $SiO_2:Na_2O$ weight ratio of about 150:1, an agerage particle size of about 150 millimicrons and a sodium sulfate content of about 0.05% by weight.

The above composition is then applied to one side of a bleached 100 lb./ream kraft paper from an applicator roll as the paper passes at a rate permitting an even application of the film forming composition over the surface of the paper, the paper continually passing through a drying zone (about 75° C.). The dried coated paper so obtained is characterized by excellent resistance to soiling, high gloss, smooth clear continuous transparent finish and good antiblocking properties. The thickness of the dried film is about 0.5 ml.

*Example III*

The following compositions are prepared by adding with sufficient agitation to dissolve a water-soluble polymerization product containing 100% acrylamide (i.e. $CH_2=CH-CO.NH_2$) and having an average molecular weight of 1,000,000 in parts by weight as indicated below to 333 parts by weight of an alkali-stabilized silica aquasol having an $SiO_2$ content of 30.0% by weight, a pH of about 9.5, and $SiO_2:Na_2O$ weight ratio of about 150:1, an average particle size of about 150 millimicrons and a sodium sulfate content of about 0.05% by weight:

| Composition | Polymerization Product | $SiO_2$:Polymer, Weight Ratio |
|---|---|---|
| A | 1,000 | 1:10 |
| B | 500 | 1:5 |
| C | 100 | 1:1 |
| D | 20 | 5:1 |
| E | 10 | 10:1 |
| F | 5 | 20:1 |

The respective film-forming compositions so prepared and a film forming composition containing 5 parts by weight of the above-described water-soluble polymerization product containing 100% acrylamide, i.e.

$$CH_2=CH-CO.NH_2$$

in 95 parts by weight of water identified below as composition G are evaluated for antisoiling properties as follows:

The respective compositions A through G inclusive are applied to sheets of white patent coated news backed boxboard printed solid red at a rate permitting an even application of each over the surface of the board, the board is then dried at 110° C. for 10 minutes.

The respective dried coated boxboard samples and an uncoated boxboard sample are placed in a closed box containing an air line at one end which air line is equipped with a 200 mesh screen at its mouth. Approximately 0.7 gram of synthetic soil (described on p. 156 of vol. 27, Journal of the American Oil Chemist's Society, May 1950) is injected in the air line and 8 pounds pressure is turned on and off quickly permitting the soil to be blown through the 200 mesh screen and into and about the inside of the box. This is repeated twice more at 5 minute intervals. The synthetic soil is then allowed to settle out of the air and onto the samples. The samples are removed from the box and subjected to a stream of air from a spray gun with a sweeping motion to remove the soil or duct which is not adhered to the respective boxboard samples. The respective boxboard samples are then measured on a Gardner automatic color-difference meter calibrated against a red standard and having the following values

| $Rd$ | $a$ |
|---|---|
| 7.3 | +61.5 | which instrument is a tristimulus colorimeter which measures color on three scales in order to determine (1) the color difference between two objects, or (2) the color of an object relative to a standard. The reading of each coated boxboard sample and the uncoated boxboard sample is noted before (reading clean) and after (reading dirty) testing and recorded. The percent soiling is obtained from the following equation:

$$\frac{\text{Reading clean}-\text{reading dirty}}{\text{Reading clean}} \times 100$$

The foregoing procedure is repeated twice more and the average of the three runs is as follows:

| Sample coated with composition: | Percent soiling |
|---|---|
| A | 11.0 |
| B | 10.0 |
| C | 10.0 |
| D | 6.50 |
| E | 2.80 |
| F | 5.25 |
| G | 34.0 |
| Uncoated | 11.0 |

In contrast to the foregoing a varnish coated white patent coated news backed boxboard printed solid red upon evaluating in accordance with the procedure set forth in Example III above exhibits 29% soiling.

The dried films or coatings of compositions A through F inclusive are smooth, continuous, clear and transparent. They further are characterized by high gloss, good scuff-resistance, excellent flexibility and antislip properties. In contrast to such the dried film or coating obtained from an aqueous dispersion of the colloidal silica sol of Example III is brittle and characterized by poor scuff-resistance.

In instances wherein increased flexibility is desired a small amount, e.g. up to about 1% by weight of the total composition, of a water-soluble plasticizer such as polypropylene glycol can be incorporated in the film-forming composition hereinbefore described. While the dry coatings obtained from the film forming composition hereinbefore described are characterized by excellent anchorage to ink (i.e. printed matter) and to the paper base, in some instances it is necessary to wet the paper surface. Such can be conveniently done by incorporating in the film forming composition a small amount (e.g. up to about 2% by weight of the total composition) of an anionic or non-ionic surfactant or mixture thereof. As illustrative of such surfactants or non-soap surface active agents are the water-soluble polyglycol ethers containing at least three alkenoxy groups which may be represented by the structure $$R-A-(R'O)_nH$$

wherein $R'$ is an alkene radical containing from 2 to 4 carbon atoms (but preferably $-CH_2CH_2-$) wherein $n$ is a whole number greater than 3, wherein $A$ is S, O, NH or CO.O and wherein R is a hydrocarbon radical containing at least 6 carbon atoms, e. g. hexyl, octyl, lauryl, cetyl, stearyl, octylphenyl, etc. These non-ionic surface active agents are well known materials prepared from an alkylene oxide such as ethylene oxide and a mercaptan, or an alcohol, an alkylphenol, or a carboxylic acid or an amine, of the structure RAH wherein R and A have the aforedescribed significance. These are all well known materials. Other operable non-soap surface active agents are the anionic surfactants such as the long chain alkyl sulfonates and alkylaryl sulfonates, e.g. sodium salt of dodecyl benzene sulfonic acid.

What is claimed is:

1. A composition of matter capable of forming soil-resistant and slip-resistant coatings consisting essentially of an aqueous medium having alkali-stabilized colloidal silica dispersed therein and having dissolved therein a water-soluble polymerization product of at least 80% by weight of a compound selected from the group consisting of acrylamide and alpha-methyl acrylamide and up to 20% by weight of a mono-ethylenically-unsaturated, organic compound copolymerizable therewith, the quantity of $SiO_2$ being in the range of 10 to 2500 parts by weight of $SiO_2$ per 100 parts by weight of said water soluble polymer.

2. A composition capable of forming soil-resistant and slip-resistant coatings consisting essentially of an aqueous medium having alkali-stabilized colloidal silica dispersed therein and having dissolved therein a water-soluble copolymer of at least 80% by weight of acrylamide and up to 20% by weight of styrene, the quantity of colloidal silica as $SiO_2$ being in the range of about 5% to 45% by weight of the coating composition and said composition containing from 800 to 1500 parts by weight of $SiO_2$ per 100 parts by weight of said water-soluble polymerization product.

3. A coating composition capable of forming soil-resistant and slip-resistant coatings consisting essentially of an aqueous medium having alkali-stabilized colloidal silica dispersed therein and having dissolved therein a water-soluble polymerization product of acrylamide, the quantity of colloidal silica as $SiO_2$ being in the range of about 15% to 40% by weight of the coating composition and being in the range of 800 to 1500 parts by weight of $SiO_2$ per 100 parts by weight of said water soluble polymer.

4. A coating composition capable of forming soil-resistant and slip-resistant coatings consisting essentially of an aqueous medium having alkali-stabilized colloidal silica dispersed therein and having dissolved therein a water-soluble polymerization product of at least 80% by weight of acrylamide and up to 20% by weight of acrylic acid, the quantity of $SiO_2$ being in the range of about 15% to about 40% by weight of the coating composition and being about 800 to 1500 parts by weight of $SiO_2$ per 100 parts by weight of said water soluble polymer.

5. The method of coating which comprises applying to the surface of a fibrous cellulosic sheet the composition of claim 1 and then heat drying the composition to form a soil-resistant and slip-resistant surface coating.

6. The method of coating which comprises applying to the surface of a cellulosic paper the composition of claim 2 and then drying the composition to form a soil-resistant and slip-resistant surface coating.

7. The method of coating which comprises applying to the surface of a cellulosic paper the composition of claim 3 and then heat drying the composition to form a soil-resistant and slip-resistant surface coating.

8. The method of coating which comprises applying to the surface of a cellulosic paper the composition of claim 1 and then heat drying the composition to form a soil-resistant and slip-resistant surface coating.

9. A fibrous cellulosic sheet having an adherent soil-resistant and slip-resistant coating formed from the composition of claim 1.

10. A cellulosic paper having an adherent soil-resistant and slip-resistant coating formed from the composition of claim 2.

11. A cellulosic paper having an adherent soil-resistant and slip-resistant coating formed from the composition of claim 3.

12. A cellulosic paper having an adherent soil-resistant and slip-resistant coating formed from the composition of claim 4.

References Cited in the file of this patent

UNITED STATES PATENTS

| | | |
|---|---|---|
| 2,251,296 | Shipp | Aug. 5, 1941 |
| 2,375,738 | White | May 8, 1945 |
| 2,527,329 | Powers | Oct. 24, 1950 |
| 2,572,578 | Trail | Oct. 23, 1951 |
| 2,577,485 | Rule | Dec. 4, 1951 |
| 2,597,872 | Iler | May 27, 1952 |
| 2,616,818 | Azorlosa | Nov. 4, 1952 |
| 2,626,941 | Habeck | Jan. 27, 1953 |
| 2,661,309 | Azorlosa | Dec. 1, 1953 |
| 2,662,013 | Sulich | Dec. 8, 1953 |
| 2,805,159 | Unkauf | Sept. 3, 1957 |
| 2,833,661 | Iler | May 6, 1958 |